United States Patent [19]

Hayashi et al.

[11] Patent Number: 4,470,478
[45] Date of Patent: Sep. 11, 1984

[54] VEHICLE SPEED CONTROL APPARATUS WITH SET INCREASE

[75] Inventors: Kazuhiko Hayashi, Toyota; Jiro Masuda, Kobe, both of Japan

[73] Assignees: Toyota Jidosha Kogyo Kabushiki Kaisha, Aichi; Fujitsu Ten Limited, Hyogo, both of Japan

[21] Appl. No.: 294,155

[22] Filed: Aug. 19, 1981

[30] Foreign Application Priority Data

Sep. 9, 1980 [JP] Japan ................. 55-123977
Sep. 9, 1980 [JP] Japan ................. 55-123978
Sep. 9, 1980 [JP] Japan ................. 55-123979

[51] Int. Cl.³ .............................................. B60K 31/00
[52] U.S. Cl. ................................. 180/176; 123/352; 361/239
[58] Field of Search ............. 123/352; 180/175, 176, 180/178, 179; 361/239, 241, 242; 246/187 R, 187 C; 318/311

[56] References Cited

U.S. PATENT DOCUMENTS

| | | | |
|---|---|---|---|
| 3,455,411 | 7/1969 | Carp et al. | 180/176 |
| 3,485,316 | 12/1969 | Slavin et al. | 180/176 |
| 3,705,639 | 12/1979 | Colling et al. | 180/176 |
| 3,715,006 | 2/1973 | Walsh et al. | 180/176 |
| 3,952,829 | 4/1976 | Gray | 361/239 |
| 4,094,378 | 6/1978 | Sheyhing et al. | 180/176 |
| 4,250,854 | 2/1981 | Matsui et al. | 123/352 |
| 4,380,799 | 4/1983 | Allard et al. | 180/178 |
| 4,402,376 | 9/1983 | Hayashi et al. | 180/179 |

Primary Examiner—David M. Mitchell
Attorney, Agent, or Firm—Kenyon & Kenyon

[57] ABSTRACT

A vehicle speed control apparatus for automatically maintaining the vehicle speed of an automobile at a desired speed without the operation of the accelerator pedal, which apparatus includes an increase switch and a speed-increase means for continuously increasing the opening degree of the throttle valve when the increase switch is operated. When the increase switch is operated, the desired speed changes in response to the increasing actual speed of the automobile. The desired speed is finally determined to be the value of the actual vehicle speed just before the increase switch returns to the non-operating condition.

3 Claims, 3 Drawing Figures

VEHICLE SPEED CONTROL APPARATUS WITH SET INCREASE

BACKGROUND OF THE INVENTION

The present invention relates to a vehicle speed control apparatus of an automobile and more particularly relates to an apparatus for automatically maintaining the vehicle speed at a desired speed without driver operation of the accelerator pedal.

A conventional vehicle speed control apparatus consists of a storing device which stores the actual running speed of an automobile at the time when a set switch is operated, a comparator which compares the actual running speed with the stored running speed, and a speed adjustor which adjusts the opening degree of a throttle valve to maintain the running speed of the automobile at the stored running speed, in other words, at the desired running speed.

However, the conventional vehicle speed control apparatus has no increase operation mechanism for increasing the stored running speed either continuously or in fairly large increments. Therefore, according to the prior art, in order to increase the stored running speed, it is necessary to discontinue the operation of the automatic vehicle speed control and to increase the actual running speed of the vehicle by depressing the accelerator pedal. The set switch is then operated causing the automatic vehicle control operation to resume. Therefore, according to the prior art, this very complicated procedure is necessary to increase the stored running speed.

It is, therefore, an object of the present invention to provide a vehicle speed control apparatus which is capable of increasing the stored running speed without complicated procedures.

Another object of the present invention is to provide a vehicle speed control apparatus which is capable of preventing a setting operation from being carried out when an increase switch for increasing the stored running speed malfunctions.

A further object of the present invention is to provide a vehicle speed control apparatus which is capable of correctly performing both a resuming operation for resuming the vehicle speed control operation to maintain the vehicle speed at the stored running speed and an increasing operation for increasing the stored running speed by a single operation switch.

SUMMARY OF THE INVENTION

According to the present invention, a vehicle speed control apparatus is provided with: a first instruction switch means for generating a first electrical signal when operated; a second instruction switch means for generating a second electrical signal when operated and; means for providing a third electrical signal which indicates a desired vehicle speed of the automobile, in response to a selectable one of the first electrical signal applied from the first instruction switch means and the second electrical signal applied from the second instruction switch means. In addition, the vehicle speed control apparatus is provided with means for detecting the actual vehicle speed of the automobile to generate a fourth electrical signal which indicates the detected vehicle speed; means for comparing the level of the fourth electrical signal with the level of the third electrical signal to generate a fifth electrical signal which indicates the result of the above comparison; means, in response to the fifth electrical signal applied from the comparing means, for increasing or decreasing the opening degree of the throttle valve to reduce the difference between the actual vehicle speed and the desired vehicle speed; and means for continuously increasing the opening degree of the throttle valve when the second electrical signal is applied thereto.

The above and other related objects and features of the present invention will be apparent from the description of the present invention set forth below, with reference to the accompanying drawings, as well as from the appended claims.

DETAILED DESCRIPTION OF THE PREFERRED EMBODIMENTS

Figure 1:
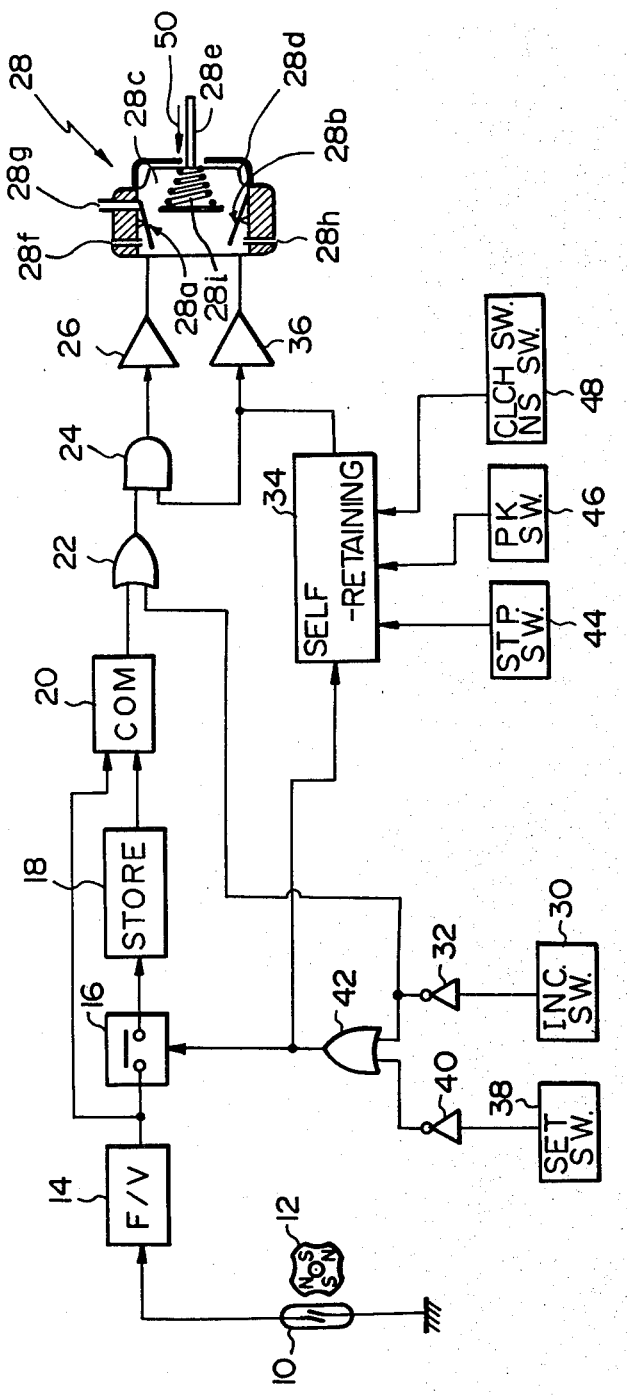
FIG. 1 is a block diagram illustrating a first embodiment of the present invention.

Referring to FIG. 1, which illustrates a first embodiment of the present invention, reference numeral 10 denotes a reed switch reference and numeral 12 denotes a rotator of permanent magnets which is turned by a speedometer cable of an automobile. The switch 10 performs the operation of turn-on and turn-off in accordance with the revolution of the rotator 12, and produces pulse signals having a frequency which is proportional to the vehicle speed of the automobile. The pulse signals are converted by a frequency-voltage converter circuit (F/V converter circuit) 14 into a DC voltage having a level which corresponds to the vehicle speed. When the analog switch 16 is in the "on" condition, the output voltage of the F/V converter circuit 14 is fed to a storing circuit 18, and the voltage, just before the analog switch 16 is turned off, is stored as a desired vehicle speed voltage in the storing circuit 18. The storing circuit 18 usually consists of a capacitor. The desired vehicle speed voltage stored in the storing circuit 18 is compared in a comparator circuit 20 with the output voltage of the F/V converter circuit 14, i.e., with the voltage which corresponds to the actual running speed of the vehicle. The comparator circuit 20 produces pulse outputs having a duty ratio which is changed in accordance with the comparison result. The outputs from the comparator circuit 20 are fed to an actuator 28 via an OR gate 22, an AND gate 24 and a drive circuit 26. A control valve 28a of the actuator 28 is energized by the outputs from the comparator circuit 20 so that the energizing time period thereof is shortened when the actual vehicle speed is higher than the desired vehicle speed, and lengthened when the actual vehicle speed is lower than the desired vehicle speed. In addition to the outputs from the comparator circuit 20, an output from an increase switch 30 is applied to the OR gate 22 via an inverter 32. The increase switch 30 produces an output of the logical level of "0" when it is operated by an operator, and produces an output of the logical level of "1" when it is non-operated. Therefore, when the increase switch 30 is operated, a signal of the logical level of "1" is applied to the OR gate 22.

The AND gate 24 opens only when an output from a self-retaining circuit 34 is of the logical level of "1", and permits the outputs from the comparator circuit 20 to transmit therethrough to the drive circuit 26.

In addition to the control valve 28a, the actuator 28 has a release valve 28b, a control chamber 28c, a diaphragm 28d and a rod 28e. One end of the rod 28e is affixed to the diaphragm 28d and the other end of the rod 28e is coupled to an accelerator link (not illustrated) for actuating a throttle valve (not illustrated) of the automobile. The diaphragm 28d is actuated by the pneumatic pressure in the control chamber 28c and by the pressing force of a spring 28i. The pneumatic pressure in the control chamber 28c is controlled by the control valve 28a and the release valve 28b. The control valve 28a, as mentioned hereinbefore, is energized and deenergized in response to the outputs from the comparator circuit 20, and the release valve 28b is energized and deenergized in response to the output of the self-retaining circuit 34 introduced through a drive circuit 36. When the control valve 28a is energized, a vacuum is introduced into the control chamber 28c via a port 28g and a port 28f is closed to prevent atmospheric pressure from being introduced into the chamber 28c. Contrary to this, when the control valve 28a is deenergized, the atmospheric pressure is introduced into the chamber 28c via the port 28f. When the release valve 28b is energized, a port 28h is closed to prevent atmospheric pressure from being introduced into the chamber 28c. Contrary to this, when the release valve 28b is deenergized, the port 28h is opened to introduce atmospheric pressure into the chamber 28c.

The set switch 38 produces an output of the logical level of "0" when it is operated by an operator, and produces an output of the logical level of "1" when it is non-operated which is the same way the increase switch functions. The output from the set switch 38 is applied to an OR gate 42 via an inverter 40. The output from the increase switch 30 is also applied via the inverter 32 to the OR gate 42. The output from the OR gate 42 is applied to the analog switch 16 and to the self-retaining circuit 34. Therefore, the analog switch 16 is turned on when either the set switch 38 or the increase switch 30 is operated, and turned off when neither the set switch 38 nor the increase switch 30 is operated. The self-retaining circuit 34 is set when the set switch 38 or the increase switch 30 is operated.

The self-retaining circuit 34, which may be composed of a flip-flop, retains the fact that the setting operation was effected by the set switch 38 or by the increase switch 30, and energizes the release valve 28b, during the time it retains this fact. The self-retaining circuit 34 is reset, when the brake pedal is depressed, causing a stop lamp switch 44 to turn on; when a parking brake switch 46 is turned on; or when either a clutch switch or neutral start switch 48 is turned on, thereby deenergizing the release valve 28b.

The operation of the embodiment will now be illustrated below.

When the set switch 38 is operated, the self-retaining circuit 34 is set, causing the release valve 28b to energize and thus the port 28h for introducing atmospheric pressure is closed. At the same time, the analog switch 16 is turned on, and the voltage corresponding to the actual vehicle speed is applied to the storing circuit 18. The analog switch 16 is turned off when the set switch 38 returns to the non-operating condition. Here, the voltage, corresponding to the actual vehicle speed just before the analog switch 16 is turned off, is stored in the storing circuit 18 as the desired vehicle speed voltage.

Since the self-retaining circuit 34 is set, and AND gate 24 is opened to allow the operation of the control valve 28a, depending upon the output from the comparator circuit 20. Thereby, the actuator 28 controls the opening degree of the throttle valve so that the actual vehicle speed becomes equal to the stored vehicle speed.

If the increase switch 30 is operated, the same operations take place as those when the set switch 38 is operated. Furthermore, if the increase switch 30 is operated, a signal of the logical level of "1" is applied to the drive circuit 26 via the OR gate 22 and the AND gate 24. Therefore, the control valve 28a is energized while the increase switch 30 is operated, causing the rod 28e of the actuator 28 to move toward the direction indicated by an arrow 50. As a result, the throttle valve turns toward the opening direction and the vehicle speed continuously increases. When the increase switch 30 returns to the non-operating condition, the analog switch 16 turns off and thus the voltage, corresponding to the actual vehicle speed just before the analog switch 16 is turned off, is stored in the storing circuit 18 as the desired vehicle speed voltage. Then, the actual vehicle speed is controlled to be equal to the stored vehicle speed.

In the above first embodiment, a diaphragm type actuator is employed as the actuator 28. However, a well-known servomotor type or step-motor type actuator can be used as the actuator 28.

According to the first embodiment of the present invention, as illustrated in detail in the foregoing, an increase switch, which is independent of the set switch, is employed so as to continuously turn the throttle valve toward the opening direction and to renew the stored vehicle speed when it is operated. Therefore, the stored running speed of the vehicle can be continuously and very easily increased by operating the increase switch.

Figure 2:
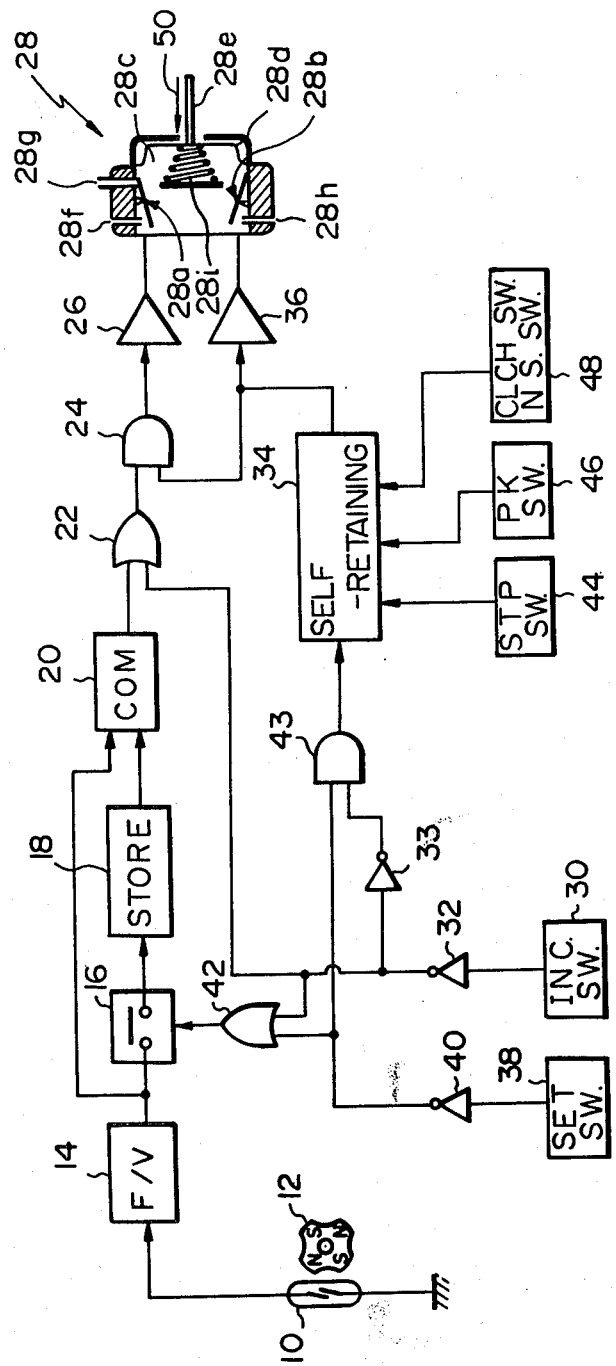
FIG. 2 is a block diagram illustrating a second embodiment of the present invention.

FIG. 2 illustrates a second embodiment of the present invention. The constitution of this second embodiment is the same as that of the first embodiment, except for the following points. In the embodiment of FIG. 2, the output from the OR gate 42 is applied only to the analog switch 16. Furthermore, the output from the increase switch 30 is applied not only to the OR gate 42 via the inverter 32 but also to an AND gate 43 via the inverter 32 and an inverter 33, and the output from the set switch 38 is applied not only to the OR gate 42 via the inverter 40, but also to the AND gate 43 via the inverter 40. The output from the AND gate 43 is applied to the self-retaining circuit 34. Therefore, according to this embodiment, if the increase switch 30 remains in the operating state because of a malfunction, since the AND gate 43 is closed, the set operation of the self-retaining circuit 34, which has been reset, cannot be carried out even if the set switch 38 is operated. If the self-retaining circuit 34 is not set and remains at the reset state, the AND gate 24 is closed to prevent the automatic vehicle speed control from operating.

The above second embodiment can prevent a dangerous increase of the vehicle speed from occuring when the increase switch 30 malfunctions and remains in an operating state, in other words, remains in the state where the output thereof is the logical level of "0". Such a dangerous increase of the vehicle speed will occur in the following case. If the increase switch 30 remains in the operating state, the actual vehicle speed, as well as the stored vehicle speed, will increase to a high speed. In this case, if the operator depresses the brake pedal or clutch pedal causing the stop lamp switch 44 or clutch switch 48 to turn on, the self-retaining circuit 34 is reset, and thus the increase of the vehicle speed is stopped. However, if the set switch 38 is operated just after the above reset operation of the self-retaining circuit 34 causing the circuit 34 to be set, since the stored vehicle speed is high, the controlled vehicle speed will be rapidly increased. This increase is very dangerous. However, according to the above second embodiment, since the AND gate 43 is closed during the operating state of the increase switch 30, the self-retaining circuit 34 is not able to be set, even when the set switch 38 is operated by mistake, just after the reset operation of the self-retaining circuit 34. Thus, the second embodiment has a fail-safe function with respect to the increase switch.

In the aforementioned first and second embodiments, a single switch may be used as the increase switch and as a resuming switch for resuming the automatic vehicle control operation with the last stored vehicle speed, in order to reduce the number of operation switches. However, if such a combined use switch is operated during the time the automatic vehicle speed control operation is not in use, since both the increase operation and the resuming operation are carried out, the vehicle speed for storing cannot return to the last stored vehicle speed at the previous vehicle speed control operation.

Figure 3:
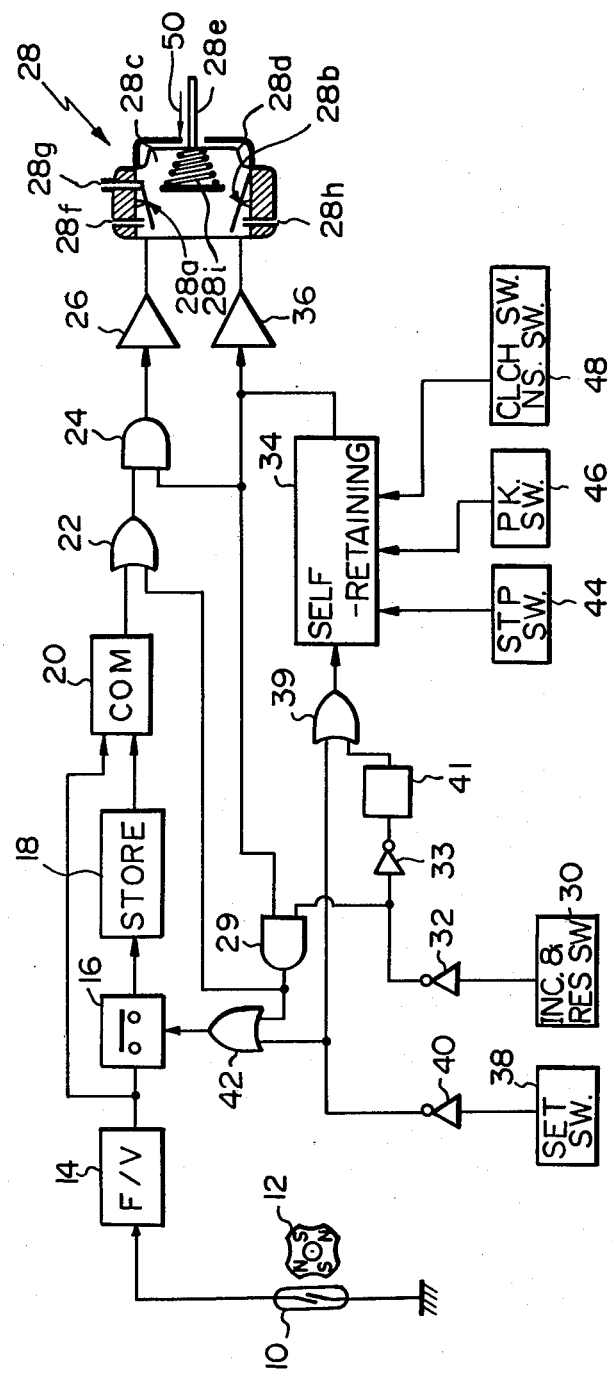
FIG. 3 is a block diagram illustrating a third embodiment of the present invention.

FIG. 3 illustrates a third embodiment of the present invention, which can eliminate the above-mentioned trouble from the vehicle speed control apparatus. The constitution of this third embodiment is the same as that of the second embodiment, except for the following points. In the embodiment of FIG. 3, the output from the increase and resuming switch 30 is applied to the OR gate 42 and to the OR gate 22 via the inverter 32 and also via an AND gate 29. To the AND gate 29, the output from the self-retaining circuit 34 is applied. Furthermore, in the embodiment of FIG. 3, an OR gate 39 is employed instead of the AND gate 43 in the embodiment of FIG. 2. Between the inverter 33 and the OR gate 39, a one-shot multivibrator 41 of a positive edge trigger type is inserted.

Therefore, the analog switch 16 is turned on when the set switch 38 is operated and when the increase and resuming switch 30 is operated while the self-retaining circuit 34 is in the set condition. The self-retaining circuit 34 is set when the set switch 38 is operated and when the output of the increase and resuming switch 30 changes from "0" to "1", in other words, when the increase and resuming switch 30 changes from the operating condition to the non-operating condition.

During the automatic vehicle speed control operation, if the increase and resuming switch 30 is operated, since the self-retaining circuit 34 is in the set condition in this case and thus the AND gate 29 is opened, the analog switch 16 is in the on-condition. Therefore, in this case, the increase operation is carried out.

On the other hand, while the automatic vehicle speed control operation is stopped, if the increase and resuming switch 30 is operated, since the self-retaining circuit 34 is in the reset condition and thus the AND gate 29 is closed, the increase operation is not carried out causing the control valve 28a and the release valve 28b to be maintained in the deenergizing state. In this condition, if the increase and resuming switch 30 is changed from the operating state to the non-operating state, the one-shot multivibrator 41 is triggered and, thus, the self-retaining circuit 34 is set, causing the automatic vehicle speed control operation to resume without an increase.

As will be apparent from the above explanation, according to the third embodiment, a single switch can be used as an increase switch and as a resuming switch in order to reduce the number of the operation switches without deteriorating either the increase operation or the resuming operation.

As many widely different embodiments of the present invention may be constructed without departing from the spirit and scope of the present invention, it should be understood that the present invention is not limited to the specific embodiments described in this specification, except as defined in the appended claims.

We claim:

1. A vehicle speed control apparatus of an automobile having a throttle valve for adjusting the vehicle speed, comprising:

a first set instruction switch means for producing a first electrical signal when actuated;

a second increase and resume instruction switch means for producing a second electrical signal when actuated;

means for detecting the actual vehicle speed of the automobile to produce a third electrical signal which indicates the detected vehicle speed;

means for producing, in response to said first electrical signal, a fourth electrical signal which indicates a desired vehicle speed of the automobile, the level of said fourth electrical signal being equal to the level of said third electrical signal at a time just before said first electrical signal is cut off;

means for comparing the level of said third electrical signal with the level of said fourth electrical signal to produce a fifth electrical signal which indicates the difference between the detected vehicle speed and the desired vehicle speed;

at least one reset switch means for producing a sixth electrical signal when actuated;

a self retaining two-state circuit means for producing a seventh electrical signal during a set condition, said two-state circuit means being set when said first electrical signal is produced or when said second electrical signal is cut off and reset when said sixth electrical signal is produced;

a first gate means, connected to said second instruction switch means and to said two-state circuit means, for producing an eighth electrical signal when both said second and seventh electrical signal are produced, said eighth electrical signal being applied to said producing means and used as said first electrical signal; and means responsive to said fifth or eighth electrical signal and to said seventh electrical signal, for adjusting the opening degree of said throttle valve, said adjusting means increasing or decreasing the opening degree of said throttle valve in accordance with said fifth electrical signal so as to reduce the difference between the actual vehicle speed and the desired vehicle speed only when said two-state circuit means is under the set condition, and said adjusting means continuously increasing the opening degree of said throttle valve only when said eighth electrical signal is applied.

2. An apparatus as claimed in claim 1, wherein said producing means includes:

an analog switch connected to said detecting means, said analog switch being on to pass said third electrical signal when said first or eighth electrical signal is applied thereto; and a voltage storing circuit for storing the voltage level of said third electrical signal from said detecting means via said analog switch, the stored third electrical signal being used as said fourth electrical signal indicative of a desired vehicle speed.

3. An apparatus as claimed in claim 1, wherein said adjusting means includes:

a second gate means connected to said comparing means, to said first gate means, and to said two-state circuit means, said second gate means being on to pass said fifth or eighth electrical signal therethrough only when said two-state circuit means is under the set condition; and an adjusting mechanism, connected to said second gate means, for increasing or decreasing the opening degree of said throttle valve in accordance with said fifth electrical signal applied thereto via said second gate means so as to reduce the difference between the actual vehicle speed and the desired vehicle speed, and for continuously increasing the opening degree if said throttle valve when said eighth electrical signal is applied thereto via said second gate means so as to increase the actual vehicle speed.

* * * * *

UNITED STATES PATENT AND TRADEMARK OFFICE
CERTIFICATE OF CORRECTION

PATENT NO. : 4,470,478

DATED : September 11, 1984

INVENTOR(S) : Hayashi et al.

It is certified that error appears in the above-identified patent and that said Letters Patent is hereby corrected as shown below:

Column 8, line 10, the word "if" should be changed to --of--.

Signed and Sealed this

Seventh Day of May 1985

[SEAL]

Attest:

DONALD J. QUIGG

Attesting Officer     Acting Commissioner of Patents and Trademarks